United States Patent Office 3,332,988

Patented July 25, 1967

3,332,988

CINNAMYL GUANIDINES AND SALTS THEREOF

Robert Paul Mull, Florham Park, N.J., assignor to Ciba Corporation, New York, N.Y., a corporation of Delaware No Drawing. Filed Sept. 24, 1965, Ser. No. 490,135
19 Claims. (Cl. 260—501)

This is a continuation-in-part of application Ser. No. 322,018 filed Nov. 7, 1963, now U.S. Patent No. 3,252,861 issued May 24, 1966 which in turn is a continuation-in-part of application Ser. No. 271,866, filed Apr. 10, 1963 and now abandoned, which in turn is a continuation-in-part application of my application Ser. No. 205,083, filed June 25, 1962 and now abandoned.

The present invention concerns guanidine compounds. Particularly, it relates to compounds of the formula

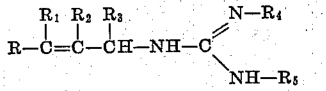

in which R stands for carbocyclic aryl, and each of the groups $R_1$, $R_2$, $R_3$, $R_4$ and $R_5$ is hydrogen or lower alkyl, or acid addition salts thereof, as well as process for the preparation of these compounds.

The carbocyclic aryl group R is more especially monocyclic carbocyclic aryl, above all phenyl, as well as substituted phenyl; the latter may have one or more than one of the same or of different substituents attached at any of the positions available for substitution. Suitable substituents are, for example, lower alkyl, e.g. methyl, ethyl and the like, trifluoromethyl, etherified hydroxyl, especially lower alkoxy, e.g. methoxy, ethoxy, isopropyloxy, n-butyloxy and the like, as well as lower alkenyloxy, e.g. allyloxy and the like, or lower alkylenedioxy, e.g. methylenedioxy and the like, esterified hydroxyl, especially halogeno (representing hydroxyl esterified by hydrohalic acid), e.g. fluoro, chloro, bromo and the like, as well as lower alkoxy-carbonyloxy, e.g. methoxy-carbonyloxy, ethoxy-carbonyloxy and the like, or lower alkanoyloxy, e.g. acetyloxy, propionyloxy and the like, acyl, such as lower alkanoyl, e.g. acetyl, propionyl and the like, etherified mercapto, such as lower alkylmercapto, e.g. methylmercapto, ethylmercapto and the like, nitro, amino, preferably N,N-disubstituted amino, for example, N,N-di-lower alkyl-amino, e.g. N,N-dimethylamino and the like. Substituted phenyl groups are more specifically represented by (lower alkyl)-phenyl, (trifluoromethyl)-phenyl, (lower alkoxy)-phenyl, (lower alkenyloxy)-phenyl, (lower alkylenedioxy)-phenyl, (lower alkoxy-carbonyloxy)-phenyl, (lower alkanoyloxy)-phenyl, (halogeno)-phenyl, (lower alkanoyl)-phenyl, (lower alkylmercapto-phenyl, (nitro)-phenyl, or (N,N-di-lower alkyl-amino)-phenyl and the like. Other carbocyclic aryl radicals representing the group R in the above formula, are bicyclic carbocyclic aryl radicals, such as naphthyl, i.e. 1-naphthyl or 2-naphthyl, or substituted naphthyl, in which the bicyclic carbocyclic aryl portion is substituted by one or more than one of the same or of different substituents, such as those mentioned above, which may be attached to any of the positions available for substitution.

The groups $R_1$, $R_2$, $R_3$, $R_4$ and $R_5$ stand primarily for hydrogen, but may also be lower alkyl, having preferably from one to four carbon atoms, particularly methyl, as well as ethyl, n-propyl, isopropyl, n-butyl, isobutyl, secondary butyl, tertiary butyl and the like.

Salts of the compounds of this invention are acid addition salts, primarily pharmaceutically acceptable, non-toxic addition salts with pharmaceutically acceptable acids, particularly inorganic acids, e.g. hydrochloric, hydrobromic, nitric, sulfuric, phosphoric acids and the like, or organic acids, such as organic carboxylic acids, e.g. acetic, malonic, succinic, maleic, hydroxymaleic, fumaric, malic, tartaric, citric, benzoic, nicotinic, isonicotinic acid and the like, or organic sulfonic acids, e.g. methane sulfonic, ethane sulfonic, 2-hydroxyethane sulfonic, ethane 1,2-disulfonic, p-toluene sulfonic, naphthalene 2-sulfonic acid and the like. Acid addition salts may also serve as intermediates, for example, in the purification or preparation of other acid addition salts, or for identification and characterization purposes. Particularly useful for the latter are salts with acidic organic nitro compounds, e.g. picric, picrolonic, flavianic acid and the like, or with metal complex acids, e.g. phosphotungstic, phosphomolybdic, chloroplatinic, Reinecke acid and the like.

The compounds of this invention may be in the form of mixtures of isomers or of single isomers. Thus, they are preferably in the form of their geometric cis-isomers and trans-isomers.

The compounds of the invention exhibit valuable pharmacological properties. Apart from their activity to increase the coronary blood flow, they show primarily hypotensive effects, which are of quick onset and considerable duration. This can be demonstrated in animal tests using, for example, normotensive anesthetized cats and dogs as test objects and enteral or parenteral doses between about 1 and 10 mg./kg./day. The new compounds are, therefore, useful as hypotensive agents and coronary dilatants. Furthermore, they are useful as intermediates in the preparation of other valuable especially pharmacologically active components.

The compounds of this invention are also useful as research tools which affect the pathways of the sympathetic nerve system. Thus, when given orally to anesthetized dogs in pharmacological experiments, they block the pressor effects of amphetamine, potentiate the pressor effects of norepinephrine and block the carotid occlusion pressor reflex; however, unlike other compounds with a similar pattern of pharmacological properties, they do not cause a relaxation of the nictitating membrane. In a different pharmacological experiment, in which a smaller amount of the test substance is administered into the small intestine of an anesthetized dog, it has been found that the compounds of this invention antagonize the pressor effects of amphetamine, epinephrine, norepinephrine and angiotensin amide. In the same experiment, other known antihypertensive compounds having the characteristic guanidine group also decrease the pressor effects of amphetamine but potentiate those of epinephrine, norepinephrine and angiotensin amide. In view of the fact that the compounds of this invention affect the responsiveness of tne arterioles to catecholamines and hypertensive polypeptide compounds, they can be used to measure small quantities of such substances, which would not be detectable otherwise.

It has also been found, that the compounds of this invention do not significantly increase the heart rate; this in contrast to other antihypertensive compounds having a similar pattern of pharmacological properties, which tend to cause considerable tachycardia.

It has also been observed that contrary to the compounds having the trans-configuration, particularly the trans-cinnamyl-guanidine, the compounds having the cis-configuration, particularly the cis-cinnamyl-guanidine, are virtually free from any effects on the respiration.

Particularly useful are the cis-isomers, as well as the trans-isomers of the compounds of the formula

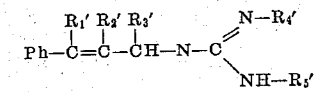

in which Ph stands for phenyl, (lower alkyl)-phenyl

:lower alkoxy)-phenyl, (halogeno)-phenyl or (trifluoro-nethyl)-phenyl, and each of the groups $R_1'$, $R_2'$, and $R_3'$ s particularly hydrogen, as well as methyl, and each of he groups $R_4'$ and $R_5'$ is primarily hydrogen, as well is lower alkyl, particularly methyl, or especially the acid iddition salts, such as the pharmaceutically acceptable, ion-toxic acid addition salts, thereof. This group is repre-ented by the cis-isomers, as well as the trans-isomers of the compounds of the formula

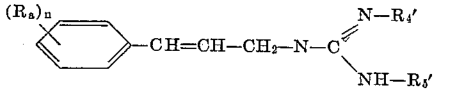

n which the group $R_a$ is primarily hydrogen, as well as ower alkyl, lower alkoxy or halogeno, the letter $n$ is an nterger from 1 to 3, and each of the groups $R_4'$ and $R_5'$ iave the previously given meaning, but stand above all or hydrogen, above all by cinnamylguanidine of the ormula

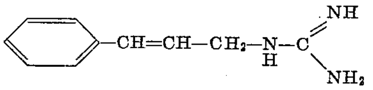

specially the cis-cinnamyl-guanidine of the formula

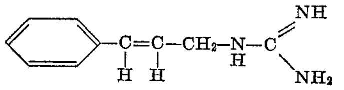

articularly the acid addition salts, such as the pharma-eutically acceptable, non-toxic acid addition salts, iereof.

The new guanidine compounds of this invention are repared according to known methods, for example, by onverting in an amine of the formula

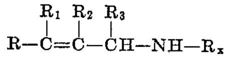

i which each of the groups R, $R_1$, $R_2$ and $R_3$ have the reviously-given meaning, and $R_x$ is hydrogen or a group apable of being converted into an amidino group of the ormula

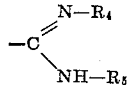

i which $R_4$ and $R_5$ have the previously-given meaning, or salt thereof, the group of the formula —NH—$R_x$ into guanidino group having the formula

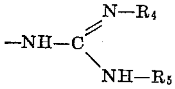

. which $R_4$ and $R_5$ have the previously-given meaning, id, if desired, converting a resulting salt into the free impound or into another salt, and/or, if desired, con-rting a free compound into a salt thereof, and/or, if sired, separating a resulting mixture of isomers into the ngle isomers.

The preferred starting materials used in the above re-tion are those, in which $R_x$ stands for hydrogen. The agents of choice for the conversion of an N-unsubsti-ted amino group into a guanidino group are the S-lower kyl-isothioureas or O-lower alkyl-isoureas having the rmula

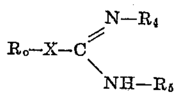

which $R_4$ and $R_5$ have the previously-given meaning, , stands for lower alkyl, particularly methyl, as well ethyl, n-propyl, isopropyl and the like, and X is pri-arily sulfur, as well as oxygen, or acid addition salts ereof. The latter, which are employed in preference er the free compound, are especially the salts with minerals acids, such as hydrochloric, hydrobromic, sulfuric acid and the like. The preferred reagents are the mineral acid addition salts of S-methyl-isothiourea, e.g. S-methyl-isothiourea sulfate, hydrochloride and the like. The starting materials are preferably used in the form of the free bases.

The reaction is carried out by contacting the starting material with the reagent, preferably in the presence of a diluent, the choice of which depends primarily on the solubility of the reactants. Water or water-miscible organic solvents, such as lower alkanols, e.g. methanol, ethanol, propanol, isopropanol, tertiary butanol and the like, ethers, e.g. diethyleneglycol dimethylether, p-dioxane, tetrahydrofuran and the like, ketones, e.g. acetone, ethyl methyl ketone and the like, lower alkanoic acids, e.g. acetic acid and the like, formamides, e.g. formamide, N,N-dimethylformamide and the like, or aqueous mixtures of such solvents are preferred diluents. The reaction may be carried out at room temperature or at an elevated temperature, for example, on the steam bath or at the boiling temperature of the solvent. An absence of oxygen may be achieved by performing the reaction in the atmosphere of an inert gas, e.g. nitrogen.

Another reagent capable of transforming an N-unsubstituted amino group into the desired guanidino group, is a cyanamide compound of the formula

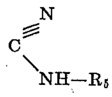

in which $R_5$ has the previously-given meaning. For example, a mixture of the cyanamide compound with the amine starting material, which is preferably used in the form of a salt thereof, particularly a mineral acid addition salt, e.g. hydrochloride, hydrobromide, sulfate and the like, is heated to form a melt, which is then dissolved in a solvent, such as a lower alkanoic acid, e.g. acetic acid and the like, and the desired product is isolated. The reaction may also be performed in the presence of a suitable solvent, such as a lower alkanol, e.g. ethanol and the like. The salt used as the starting material may also be formed in situ by carrying out the reaction in the presence of an acid, particularly of a concentrated aqueous mineral acid, e.g. hydrochloric acid and the like. The cyanamide reagent too may be formed in situ; for example, 1-nitroso-3-methyl-guanidine furnishes the N-methyl-cyanamide during the reaction, and the latter then reacts with the N-unsubstituted amine to form the desired guanidine compound. The reaction may proceed exothermically, and, if necessary, may be maintained by heating, for example, to from about 80° to about 200°; the atmosphere of an inert gas, e.g. nitrogen, may be advantageous.

A third modification of the general procedure for the manufacture of the compounds of this invention from the N-unsubstituted amine starting materials comprises reacting such starting material with a salt of a 1-guanyl-pyrazole. A salt of a 1-guanyl-pyrazole is primarily a salt with a mineral acid, such as, for example, nitric acid; the pyrazole nucleus of such reagent may contain additional substituents, particularly lower alkyl, e.g. methyl, ethyl and the like. 1-guanyl-3,5-dimethyl-pyrazole salts, particularly the nitrate thereof, represent the preferred reagents. The reaction may be carried out in the absence of a solvent, for example, by fusing the two reactants, or in the presence of a diluent, such as, for example, a lower alkanol, e.g. ethanol and the like; advantageously, contact with carbon dioxide should be avoided, for example, by performing the reaction in the atmosphere of an inert gas, e.g. nitrogen. The reaction mixture is preferably heated, for example, to the melting point of the mixture or to the boiling point of the solvent.

Starting materials used in the above procedure are known or are prepared according to the methods used for the known ones. However, the starting materials used for the preparation of the compounds having the cis-configuration are new and are intended to be included within the scope of this invention. These starting materials are represented by the compounds of the formula

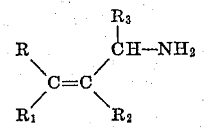

in which R, $R_1$, $R_2$ and $R_3$ have the previously given meaning, or the acid addition salts thereof. Particularly useful as starting materials for the preparation of the compounds of this invention having the cis-configuration are those of the formula

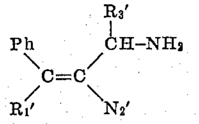

in which Ph, $R_1'$, $R_2'$ and $R_3'$ have the previously given meaning, especially those of the formula

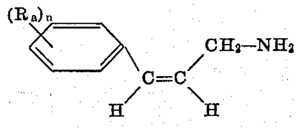

in which $R_a$ and the letter *n* have the previously given meaning, or the acid addition salts thereof. The cis-cinnamyl-amine of the formula

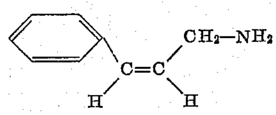

or the salts thereof, represent the preferred starting materials.

The above intermediates are prepared by converting in a cis-1-phenyl-3-$X_0$-1-propene compound, in which $X_0$ is a group capable of being converted into amino, the group $X_0$ into amino, and, if necessary, separating the desired cis-cinnamyl-amine from a resulting mixture of geometric isomers, and/or, if desired, converting a resulting salt into the free compound or into another salt, and/or, if desired, converting a resulting compound into a salt thereof.

A group $X_0$ capable of being converted into amino according to known methods, is above all the N-phthalimido group, which is split into the amino group by treatment with hydrazine. Halogeno, particularly bromo and the like, represents another group $X_0$ capable of being converted into amino by treatment with ammonia or an ammonia-furnishing reagent, whereas a carboxyl group or a functionally converted carboxyl group representing $X_0$ is converted into amino by any of the known methods, such as the Hofmann synthesis or the Curtius reaction.

The intermediates used for the preparation of the starting materials having the cis-configuration are conveniently prepared by treating a 1-phenyl-3-$X_0$-1-propyne compound, in which $X_0$ has the previously given meaning, but is particularly an N-phthalimido group, with hydrogen in the presence of a partially inactivated metal catalyst, such as a palladium-calcium carbonate catalyst, partially inactivated by treatment with lead acetate.

Apart from representing hydrogen, the group $R_x$ in the above amine starting materials may stand for a group capable of being converted into an amidino group of the formula

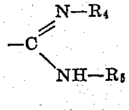

in which $R_4$ and $R_5$ have the previously given meaning.

Depending on the character of the substituent $R_x$, its conversion into an amidino group may be carried ou according to different modifications.

For example, a carbon atom of the group $R_x$ may b attached to the nitrogen atom of the amino group of th starting material, and to this carbon atom may be con nected another nitrogen atom; the carbon atom ma carry an additional nitrogen, or other heteroatoms, suc as, for example, oxygen or sulfur. The substituent R may, therefore, be represented, for example, by cyan of the formula —C≡N, carbamyl of the formul —CONH—$R_4$, in which $R_4$ has the above-given mean ing, thiocarbamyl of the formula —CSNH—$R_4$, lowe alkoxy-(imino)methyl of the formula $$-C(=N-R_4)-OR_0$$

in which $R_0$ has the previously-given meaning, i.e. rep resents lower alkyl, primarily methyl, as well as ethy and the like, lower alkyl-mercapto-(imino)methyl of th formula —C(=N—$R_4$)—$SR_0$, cyano-amidino of the for mula —C(=N—$R_4$)—N($R_5$)—C≡N, in which $R_5$ ha the previously-given meaning, guanidino-(imino)methy of the formula $$-C(=N-R_4)-[-N(R_5)-C(=NH)-NH_2]$$

isocyano-(imino)methyl of the formula $$-C(=N-R_4)-N=C=O$$

or isothiocyano-(imino)methyl of the formula $$-C(=N-R_4)-N=C=S$$

and the like. Amine starting materials having one of th above groups attached to the amino-nitrogen meet th previous requirements, i.e. to the amino group is attache a carbon atom, which carries at least one nitrogen atom apart from other nitrogen or hetero atoms. Most of th above starting materials are converted into the desire guanidino derivatives by ammonolysis or aminolysis.

For example, a cyanamide starting material may b converted into a guanidine compound by treatment wit ammonia, an ammonia-furnishing reagent or an amin Such reaction may be carried out, for example, by trea ing the cyanamide compound with ammonia or an amin usually under pressure, and at an elevated temperatur and, if necessary, in the presence of an anion capabl of forming a stable salt with a resulting guanidine; am monium acetate, ammonium sulfate, ammonium chl ride and the like, may serve as anion sources. Ammoni may be replaced by ammonia-furnishing ammoniu salts; such salts are, for example, ammonium mon hydrogen phosphate, which may be used under pre sure and at an elevated temperature, ammonium nitra and the like. In the latter case, a salt, such as, for e ample, an alkaline earth metal or an alkali metal, e. calcium, sodium, potassium and the like, salt of t cyanamide starting material is preferably used, whic may be reacted with the ammonium nitrate in the pre ence of catalytic amounts of water.

The cyanamide starting materials may be prepare for example, by treating the N-unsubstituted amine of t previous formula with cyanogen halide, e.g. cyanoge chloride, cyanogen bromide and the like, advantageous in equivalent amounts and preferably in an inert solve such as, for example, diethyl ether and the like.

A carbamyl substituent representing $R_x$ in the abo formula may be converted into the desired amidi group by treatment of the starting material having su group with ammonia or an amine, preferably, in t presence of a dehydrating agent, such as, for exampl phosphorus pentoxide and the like. This reaction may carried out at an elevated temperature and in a clos vessel; temperature and pressure may be reduced in t presence of a non-aqueous solvent and/or of a reacti accelerator, such as finely dispersed nickel, aluminu aluminum oxide and the like. Furthermore, a thi carbamyl group representing $R_x$ may be converted in ı amidino group by treatment with ammonia or an nine, for example, in the presence of water and/or : a non-hydrolytic solvent, such as, for example, toluene ıd the like, and in the presence of a desulfurizing agent. he latter is selected advantageously from basic oxides, ısic carbonates and the like, of heavy metals, such as ad, zinc, cadmium, tin, mercury and the like. Suitable ɜsulfurizing agents are, for example, lead oxide, merıric oxide, lead hydrogen carbonate and the like; merıric chloride may also be used. The ammonolysis or ninolysis procedure is preferably carried out at an evated temperature, and, if necessary, in a closed ves-l, primarily to avoid loss of ammonia or the amine.

Urea and thiourea starting materials or salts thereof ay be prepared, for example, from the N-unsubstituted nine having the previous formula by treating it with ı ammonium cyanate or thiocyanate or with a metal, ıch as alkali metal, e.g. sodium, potassium and the ĸe, cyanate or thiocyanate. These reagents are pref-ably used in the presence of a solvent, for example, ater, which, if necessary, may contain a small amount : an acid, such as a mineral acid, e.g. hydrochloric, ılfuric acid and the like. The urea or thiourea starting aterials may also be obtained by ammonolysis or ninolysis of reactive functional derivatives of N-subituted carbamic acids, as well as N-substituted thioırbamic acids, in which the N- substituent has the forula $R-C(R_1)=C(R_2)-CH(R_3)-$ which R, $R_1$, $R_2$ and $R_3$ have the previously given eaning. Reactive functional derivatives of N-substited carbamic acids or N-substituted thiocarbamic acids e primarily esters, for example, lower alkyl, e.g. methyl, hyl and the like, esters or halides, e.g. chlorides and e like, of such acids. Upon ammonolysis or aminolysis, necessary, at an elevated temperature and in a closed ssel, these carbamic and thiocarbamic acids yield the sired urea or thiourea derivatives, respectively.

N-substituted O-lower alkyl-isoureas and N-substituted lower alkyl-isothioureas, in which the N-substituent has e formula $R-C(R_1)=C(R_2)-CH(R_3)-$ which R, $R_1$, $R_2$ and $R_3$ have the previously given meang, or salts thereof, are compounds of the previously ven formula, in which $R_x$ is an O-lower alkoxy-(imino) ethyl group of the formula $-C(=N-R_4)-OR_o$ and ı S-lower alkyl-mercapto-(imino)methyl group of the rmula $-C(=N-R_4)-SR_o$, respectively. Ammonoly-: of these starting materials to form the desired guanine compounds may be carried out by treatment with nmonia, either in its liquid form or in solution, such an aqueous solution, whereby an elevated temperature ıd/or a closed vessel, as well as the presence of an amonium salt, such as ammonium chloride and the like, ay be required. If necessary, dehydrating agents or sulfurizing agents, such as those previously described, ay be present in the reaction medium, depending on the pe of starting material used.

The isourea and isothiourea starting materials may be tained, for example, from the previously-mentioned ea and thiourea compounds by treatment of the latter of their metal salts, such as the alkali metal, e.g. sodium, tassium and the like, salts thereof, with a lower alkyl lide, e.g. methyl or ethyl chloride, bromide or iodide d the like, or with a dilower alkyl sulfate, e.g. dimethyl lfate, diethyl sulfate and the like. Such reaction may be rried out in the presence of a solvent, the selection of ıich depends on the type of reagents used; a free urea thiourea compound may be used in the presence of ater or a lower alkanol, e.g. methanol, ethanol and the ĸe, whereas an alkali metal salt of the urea or thiourea compound may be reacted in the presence of a hydrocarbon, e.g. toluene and the like, solution.

A cyanamidino substituent representing $R_x$ in the starting materials of the previously given formula, may be converted into an amidino group by ammonolysis or aminolysis. Such reaction may be carried out by treatment with ammonia, as well as with an ammonium salt, e.g. ammonium chloride, ammonium nitrate, ammonium sulfate and the like, which may also promote ammonolysis with ammonia itself, or by treatment with an amine.

In the ammonolysis or aminolysis procedure of a cyano-guanidine derivative as described above, a biguanide intermediate may be formed, which, upon further treatment with the ammonolysis or aminolysis reagent, may be converted into the desired guanidine compound. Such biguanide derivative is accessible through different routes (as will be shown below), and is, therefore, also useful as a starting material in the formation of the desired guanidine compounds of this invention.

The cyano-guanidine starting material may also be converted into the desired guanidine compound by reductive cleavage of the cyano group. Such cleavage may be carried out, for example, by electrolytic reduction on a cathode, e.g. a lead cathode.

The cyano-guanidine starting material used in the above ammonolysis, aminolysis or reduction procedure, may be prepared by treatment of an N-substituted S-lower alkyl-cyano-isothiourea, in which the N-substituent has the formula $R-C(R_1)=C(R_2)-CH(R_3)-$ in which R, $R_1$, $R_2$ and $R_3$ have the previously given meaning, with ammonia or an amine, for example, in the presence of a lower alkanol, e.g. ethanol and the like, preferably in a sealed tube.

Since the previously-described cyano-guanidine derivatives are obtained by ammonolysis or aminolysis from S-lower alkyl-cyanoisothiourea compounds, the latter may, therefore, directly serve as starting materials for the preparation of the desired guanidine compounds of this invention. Ammonolysis or aminolysis of the cyanoisothiourea compounds to the latter may be carried out by treatment with ammonia or an amine in the presence of the anion of a strong acid, such as of a hydrohalic, nitric, sulfuric acid and the like, for example, in the presence of the respective ammonium salts of such acids.

The above N-substituted S-lower alkyl-cyanoisothiourea starting materials or their salts may be obtained, for example, by treating the corresponding N-substituted isothiocyanate with an alkali metal, e.g. sodium, cyanamide, and alkylating a resulting N-substituted-N'-cyano-2-thiourea, preferably a salt thereof, according to the previously described method, for example, with a lower alkyl halide or with a di-lower alkyl sulfate.

As has been shown, ammonolysis or aminolysis of the cyano-guanidine starting materials may give rise to the formation of biguanide compounds or salts thereof. These compounds may also be prepared, for example, by reacting an N-substituted amine, in which the N-substituent has the formula $R-C(R_1)=C(R_2)-CH(R_3)-$ in which R, $R_1$, $R_2$ and $R_3$ have the previously given meaning, with dicyano-diamide, preferably in the presence of a complex metal-forming salt, e.g. copper sulfate and the like. The resulting biguanide complex metal salt, such as the copper complex salt thereof, may be liberated to form the free compound by treatment with an acid, such as a mineral acid, e.g. sulfuric acid and the like, to yield the free compound. As previously described, ammonolysis or aminolysis of these biguanide derivatives gives rise to the formation of the desired guanidine compounds of this invention.

Certain substituents $R_x$ may be converted into the amidino group by methods other than the above ammonolysis and aminolysis reactions.

For example, the substituent $R_x$ may be an isocyano-(imino)methyl or an isothiocyano-(imino)methyl group of the formulae $—C(=N—R_4)—N=C=O$ and $$—C(=N—R_4)—N=C=S$$

respectively. Compounds containing such groups yield upon treatment with a hydrolytic reagent, particularly with a dilute mineral acid, such as aqueous sulfuric acid and the like, the desired guanidine compounds. In such hydrolysis reaction, the desired guanidine derivative may be formed simultaneously with a biuret derivative as the by-product.

Starting materials having an isocyano-(imino)methyl or an isothiocyano-(imino)methyl group, or salts thereof, may be obtained, for example, by reacting an N-substituted cyanamide in which the N-substituent has the formula $$R—\overset{R_1}{\overset{|}{C}}=\overset{R_2}{\overset{|}{C}}—\overset{R_3}{\overset{|}{C}}H—$$

in which R, $R_1$, $R_2$ and $R_3$ have the previously given meaning, with a metal, particularly an alkali metal, e.g. sodium or potassium, cyanate or thiocyanate, in a neutral medium, for example, in the presence of water.

Apart from N-substituted $N—R_x$-amine starting materials, in which $R_x$ is a substituent having a carbon atom with a substituting nitrogen, other $N—R_x$-amines, in which $R_x$ is a substituent convertible into an amidino group, may be useful as starting materials in the manufacture of the desired guanidine compounds. In such conversion, intermediate compounds may be formed, which may have the previously described characteristics, i.e. the carbon atom of the group $R_x$ carries a nitrogen atom. Suitable $R_x$ groups of that type are, for example, ester groups, formed by a carboxyl, a thionocarboxyl, a thiolocarboxyl or a dithiocarboxyl group with a lower alkanol, as well as halogeno-carbonyl or halogeno-thionocarbonyl groups, in which halogeno represents primarily chloro. Particularly useful starting materials are, for example, the reactive functional derivatives of N-substituted carbamic acids and N-substituted thiocarbamic acids, in which the N-substituent has the formula $$R—\overset{R_1}{\overset{|}{C}}=\overset{R_2}{\overset{|}{C}}—\overset{R_3}{\overset{|}{C}}H—$$

in which R, $R_1$, $R_2$ and $R_3$ have the previously given meaning, or salts thereof. As shown above, upon ammonolysis or aminolysis, esters, for example, lower alkyl, e.g. methyl, ethyl and the like, esters, or halides, e.g. chlorides, of such acids yield the corresponding urea and thiourea derivatives. However, if, for example, the ammonolysis or aminolysis of a carbamic acid ester is carried out in the presence of a dehydrating agent, such as, for example, one of the previously described agents, an N-substituted-carbamic ester may be converted directly into the desired guanidine compound. Or, an ester of an N-substituted-thiocarbamic acid, when subjected to ammonolysis or aminolysis, may yield directly the desired guanidine compound, if the reaction is carried out in the presence of a desulfurizing reagent, such as one of those previously described, e.g. lead oxide and the like.

The carbamic and thiocarbamic acid starting materials may be prepared according to known methods. For example, upon treatment of an N-substituted amine of the previous formula with phosgene or thiophosgene, which reagents may be used in a slight excess over the amines, N-substituted isocyanates and N-substituted isothiocyanates, respectively, may be formed, in which the N-substituent has the formula $$R—\overset{R_1}{\overset{|}{C}}=\overset{R_2}{\overset{|}{C}}—\overset{R_3}{\overset{|}{C}}H—$$

in which R, $R_1$, $R_2$ and $R_3$ have the previously given meaning. Such cyanate and isothiocyanate compounds may then be converted into esters of N-substituted carbamic acids or N-substituted thiocarbamic acids by treatment with an alcohol, for example, a lower alkanol, e.g. methanol, ethanol and the like, or into the corresponding thiolesters, by treatment with a mercaptan, such as a lower alkyl-mercaptan, e.g. methylmercaptan, ethylmercaptan and the like. The above derivatives may also be obtained by reacting an N-substituted amine of the previous formula with a carbonic acid lower alkyl ester, or, particularly, a dithiocarbonic acid lower alkyl ester, as well as with a lower alkyl ester of a halogeno-formic acid, such as chloroformic acid, or, primarily, of a halogeno-thioformic acid, such as chlorothioformic acid.

Or, a salt of an N-substituted amine of the previous formula, particularly a hydrohalide, e.g. hydrochloride and the like, thereof, when reacted with phosgene or thiophosgene at an elevated temperature, preferably in a closed vessel, yields the desired N-substituted-carbamic acid chloride and N-substituted-thiocarbamic acid chloride, respectively.

Compounds of this invention having the previously given formula, in which the group $R_3$ stands for hydrogen, may also be prepared by replacing in a compound of the formula $$R—\overset{R_1}{\overset{|}{C}}=\overset{R_2}{\overset{|}{C}}—\overset{X}{\overset{\|}{C}}—NH—C(=N—R_4)—NH—R_5$$

in which R, $R_1$, $R_2$, $R_4$ and $R_5$ have the above meaning, and X stands for oxygen or sulfur, or a salt thereof, the group X by two hydrogen atoms, and if desired, carrying out the optional steps.

The group X forms together with the carbon atom a carbonyl group or a thiocarbonyl group, and in the above reaction, such group is converted into methylene. The reduction of carbonyl into the latter is carried out according to known methods, for example, by treatment with an aluminum hydride, particularly an alkali metal aluminum hydride, e.g. lithium aluminum hydride, sodium aluminum hydride, and the like, or an alkaline earth metal aluminum hydride, e.g. magnesium aluminum hydride and the like, or aluminum hydride. If necessary, activators such as, for example, aluminum chloride, may be used together with the hydride reduction reagent. The reduction with these reagents is preferably performed in the presence of an inert solvent, particularly an ether, such as a di-lower alkyl ether, e.g. diethyl ether, dipropyl ether and the like, a carbocyclic aryl lower alkyl ether, e.g. anisole and the like, or any other suitable solvent, and at an elevated temperature. Conversion of carbonyl into methylene may also be achieved by treatment with hydrogen in the presence of certain catalysts, such as copper-chromium catalysts or by electrolytic reduction.

Replacement of sulfur in the thiocarbonyl group by two hydrogens may be carried out by desulfurization according to known methods, for example, by treatment with a freshly prepared hydrogenation catalyst, such as Raney nickel, in an alcoholic solvent, e.g. methanol, ethanol and the like, if desired, in the presence of hydrogen; it may also be achieved by electrolytic reduction.

The starting materials used in the above reduction procedure may be prepared, for example, by treating a reactive functional derivative of a carboxylic acid of the formula $$R—\overset{R_1}{\overset{|}{C}}=\overset{R_2}{\overset{|}{C}}—\overset{O}{\overset{\|}{C}}—OH$$

in which R, $R_1$ and $R_2$ have the previously given meaning with a guanidine of the formula $$H_2N—C(=N—R_4)—NH—R_5$$

in which $R_4$ and $R_5$ have the above given meaning. A particularly suitable reactive functional derivative is, for :xample, an ester, such as a lower alkyl, e.g. methyl, ethyl ınd the like, ester or an activated ester, which is partic- ılarly useful for the formation of amide bonds, such as ın ester with a reactive mercaptan compound, e.g. mer- :apto-acetic acid and the like, or with a reactive hydroxyl :ompound, e.g. hydroxy-acetonitrile and the like. The reatment of the above reactive functional derivative of ı carboxylic acid with the guanidine compound may be :arried out, for example, by reacting it with the guanidine n the presence of a suitable solvent, if necessary, at an :levated temperature.

A resulting mixture, such as a mixture of the geometric :is- and trans-isomers, may be separated into the single somers according to known methods. Mixtures of geo- netric isomers may arise due to the use of starting ma- erials containing both, the cis- and trans-form, or may ›e formed during the course of the reaction. Separation ›f the mixture and isolation of the single geometric cis- ınd trans-isomers may be achieved by exploiting the ›hysico-chemical differences, particularly the different olubilities and the like, of the two stereoisomeric forms, or example, by fractional separation, particularly frac- ional crystallization and the like.

A resulting salt may be converted into the free com- ›ound in the customary way, for example, by treatment vith a strong alkaline reagent, such as an alkali metal ıydroxide, e.g. lithium hydroxide, sodium hydroxide, ›otassium hydroxide and the like, a strong quaternary ımmonium anion (hydroxyl ion) exchange preparation ınd the like.

A resulting salt may be converted into another salt ac- :ording to known methods. For example, a "mono- ulfate" may be formed by reacting the "half-sulfate" vith sulfuric acid. Furthermore, a resulting salt may be :onverted into another salt by treatment with a suitable on exchange preparation, or with a salt, e.g. sodium, ›arium, silver and the like, salt of an acid in the presence ›f a diluent, in which a resulting inorganic compound is nsoluble and is thus removed from the reaction medium.

A free compound may be transformed into an acid .ddition salt by reacting it, preferably a solution thereof n the presence of a solvent or solvent mixture, with the .ppropriate inorganic or organic acid or a solution there- ›f, or with an anion exchange preparation, and isolating he salt. Semi-, mono- or poly-salts may be formed, as vell as mixed salts, and the salts may be isolated in the orm of their hydrates or may contain solvent of crystal- ization.

The invention also comprises any modification of the ;eneral process, wherein a compound obtainable as an ntermediate at any stage of the process is used as the tarting material and the remaining step(s) of the process ; (are) carried out; also included within the scope of the nvention are any new intermediates.

In the process of this invention such starting materials re preferably used which lead to final products men- ioned in the beginning as preferred embodiments of the nvention.

The following examples illustrate the invention and are ıot to be construed as being limitations thereon. Tem- ›eratures are given in degrees centigrade.

*Example 1*

A mixture of 6.0 g. of trans-cinnamyl-amine and 6.2 :. of S-methyl-isothiourea sulfate in 15 ml. of water is efluxed for four hours. A solid material precipitates on ooling and is recrystallized from water to yield the trans- :innamyl-guanidine sulfate of the formula

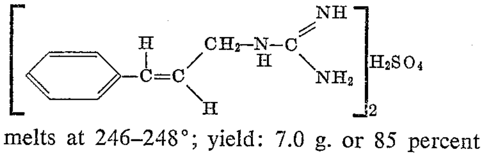

vhich melts at 246–248°; yield: 7.0 g. or 85 percent of heory.

The starting material used in the above procedure is known and is prepared as follows: A mixture of 56.9 g. of trans-cinnamyl chloride and 74.0 g. of the phthalimide potassium salt in 400 ml. of N,N-dimethylformamide is stirred for one hour at room temperature, and is then diluted with 400 ml. of chloroform. The resulting slurry is poured into 1,000 ml. of water; the organic layer is separated, the aqueous phase is extracted with chloroform, and the combined organic solutions are washed with 200 ml. of a 0.2 N aqueous solution of sodium hydroxide and with water. After drying, the solution is concentrated under reduced pressure to yield 42.0 g. of the trans-N-cinnamyl-phthalimide, which melts at 155–157°.

A mixture of 42.0 g. of trans-N-cinnamyl-phthalimide in 500 ml. of methanol is reacted with 20 ml. of hydrazine hydrate (99–100 percent) by refluxing for one hour. The resulting solution is cooled, acidified with 250 ml. of concentrated hydrochloric acid and refluxed for an additional thirty minutes. After cooling and filtering, the reaction mixture is concentrated under reduced pressure to a small volume, is again cooled and filtered, and then washed with diethyl ether to yield 13.2 g. of trans-cinnamyl-amine hydrochloride, M.P. 246–250°, which is converted into the free trans-cinnamyl-amine by dissolving it in water, treating the solution with a 50 percent aqueous solution of potassium hydroxide, saturating it with sodium carbonate and extracting the desired base with diethyl ether. The trans-cinnamyl-amine is purified by distillation and recovered at 71–74°/1 mm.

*Example 2*

A mixture of 3.4 g. of trans-cinnamyl-amine and 3.24 g. of S-methyl-isothiourea hydrochloride in 50 ml. of methanol is refluxed for six hours and concentrated under reduced pressure. The solid residue is recrystallized from acetonitrile and yields 2.7 g. of trans-cinnamyl-guanidine hydrochloride, M.P 165–170°.

*Example 3*

A column of 27 cm. length and 1.5 cm. width is charged with 35.1 g. of a (polystyrene)-type anion exchange resin-high porosity (Amberlite IRA–401, analytical grade) and is washed with 600 ml. of a 1 N solution of methane sulfonic acid in water at a flow rate of one drop per second. The eluate gives a negative test for chlorine ion; the column is washed to neutrality with 200 ml. of water, followed by 200 ml. of anhydrous methanol. The column is then charged with a solution of 2.0 g. of trans-cinnamyl-guanidine hydrochloride in 250 ml. of methanol. The combined organic eluates are concentrated under reduced pressure; the resulting solid trans-cinnamyl-guanidine methane sulfonate melts at 113–115° after one recrystallization from a mixture of methanol and diethyl ether; yield: 1.9 g.

*Example 4*

A mixture of 9.6 g. of trans-cinnamyl-amine and 19.2 g. of N,N',S-trimethyl-isothiourea monohydriodide in 65 ml. of ethanol is refluxed for four hours. After the evolution of methyl-mercaptan has ceased, the solvent is evaporated under reduced pressure; on standing the residue crystallizes to yield the trans-1,2-dimethyl-3-cinnamyl-guanidine hydroiodide of the formula:

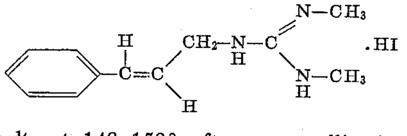

which melts at 148–158° after recrystallization from a mixture of ethanol and diethyl ether; yield: 20.5 g.

*Example 5*

A mixture of 5.0 g. of trans-p-methoxy-cinnamyl-amine and 4.26 g. of S-methyl-isothiourea sulfate in 25 ml. of water is refluxed for four hours. The reaction mixture is then cooled, whereupon the trans-p-methoxy-cinnamyl-guanidine sulfate of the formula

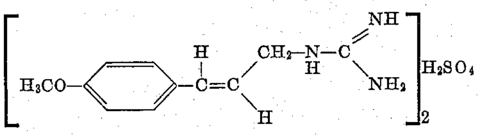

precipitates; it melts at 163–166° after recrystallization from water; yield: 4.7 g.

The starting material used in the above procedure is prepared as follows: To a mixture of 41.5 g. of phosphorus bromide and 13.0 g. of pyridine is added dropwise 57.6 of trans-p-methoxy-cinnamyl alcohol while stirring and cooling in an ice-bath at −5°. Cooling and stirring is continued overnight; the reaction mixture is extracted with diethyl ether, the ether solution is evaporated and the residue is fractionated by distillation. The desired trans-p-methoxy-cinnamyl bromide is collected at 150–154°/16 mm.; yield: 49.8 g.

A mixture of 48.0 g. of trans-p-methoxy-cinnamyl bromide, 42.5 g. of potassium phthalimide and a crystal of potassium iodide in 75 ml. of N,N-dimethylformamide is refluxed for two hours and then poured onto ice. The organic material is extracted with chloroform; the organic extract is washed with a 1 N solution of potassium hydroxide in water, 0.05 N aqueous hydrochloric acid and water, dried over sodium sulfate and concentrated to yield an oil containing the trans-N-(p-methoxy-cinnamyl)-phthalimide.

A mixture of 49.5 g. of the above oil and 20 ml. of hydrazine hydrate in 500 ml. of methanol is refluxed for two hours. A precipitate is formed within 25–30 minutes; after cooling, concentrated hydrochloric acid is added until the reaction mixture is acidic, whereupon it is refluxed for an additional thirty minutes. It is then filtered and concentrated to dryness under reduced pressure. The residue, containing the trans-p-methoxy-cinnamylamine hydrochloride is treated with an aqueous solution of potassium hydroxide; the organic material is extracted with diethyl ether and the organic solution is evaporated under reduced pressure. The oily trans-p-methoxy-cinnamyl-amine is used without further purification; its hydrochloride, prepared by dissolving the base in ethanol and treating the solution with hydrogen chloride gas, melts at 215–230°.

*Example 6*

A mixture of 5.0 g. of trans-o-chloro-cinnamyl-amine and 4.16 g. of S-methyl-isothiourea sulfate in 25 ml. of water is refluxed for four hours. After the evolution of methylmercaptan ceases, the reaction mixture is cooled and the solid material is filtered off. On recrystallization from water, it yields the trans-o-chloro-cinnamyl-guanidine sulfate of the formula

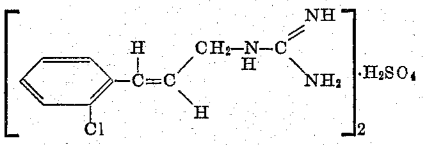

which melts at 230–231°; yield: 5.0 g.

The starting material is prepared as described in Example 5 using trans-o-chloro-cinnamyl alcohol as the starting material.

*Example 7*

A mixture of 5.0 g. of trans-m-chloro-cinnamyl-amine and 4.16 g. of S-methyl-isothiourea sulfate in 25 ml. of water is reacted as described in Example 6; the desired trans-m-chloro-cinnamyl-guanidine sulfate of the formula

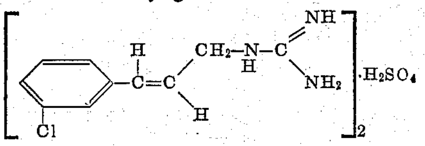

melts at 151–154° after recrystallization from water; yield: 4.5 g.

The starting material is prepared as described in Example 5 using trans-m-chloro-cinnamyl alcohol as the starting material.

*Example 8*

A mixture of 6.0 g. of trans-p-chloro-cinnamyl-amine and 5.5 g. of S-methyl-isothiourea sulfate in 15 ml. of water containing a few drops of ethanol is refluxed for five hours. The solvent is evaporated, the resulting oil solidifies and is recrystallized from a mixture of ethanol and water to yield the trans-p-chloro-cinnamyl-guanidine sulfate of the formula:

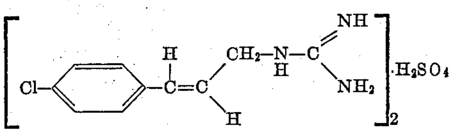

which melts at 200–209°; yield: 6.0 g.

The starting material is prepared as described in Example 5 using trans-p-chloro-cinnamyl alcohol as the starting material.

*Example 9*

A mixture of 6.0 g. of cis-cinnamyl-amine and 5.71 g. of S-methyl-isothiourea hydrochloride in 75 ml. of methanol is refluxed for six hours, during which a strong evolution of methylmercaptan occurs. The reaction mixture is concentrated under reduced pressure, and the resulting oil is dissolved in a minimum amount of ethanol (or acetonitrile), and the desired cis-cinnamylguanidine hydrochloride of the formula

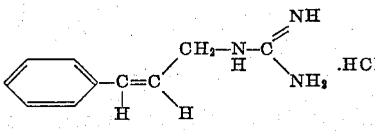

is precipitated as an oil by adding diethyl ether, M.P. <20°.

The starting material used in the above procedure is prepared as follows: A mixture of 20.35 g. of 3-chloro-1-phenyl-1-propyne (prepared according to the procedure described by Murray, J. Am. Chem. Soc., vol. 60, p. 2662 (1938)) and 27.0 g. of the phthalimide potassium salt in 160 ml. of N,N-1-dimethylformamide, containing a crystal of potassium iodide is stirred at room temperature for fifteen hours, and is then diluted with 160 ml. of chloroform while stirring. After being poured into 500 ml. of water, the organic phase is separated, the aqueous layer is extracted three times with chloroform and the combined chloroform solutions are washed with 0.2 N aqueous sodium hydroxide and water, dried over sodium sulfate and concentrated under reduced pressure to yield 30.0 g. of N-(3-phenyl-2-propynyl)-phthalimide, M.P. 158–160°.

A mixture of 25.0 g. of N-(3-phenyl-2-propynyl)-phthalimide, 1.96 g. of Lindlar catalyst (palladium-calcium carbonate catalyst, partially inactivated by treatment with lead acetate according to the procedure described by Lindlar, Helv. Chim. Acta, vol. 35, p. 446 (1952)), and 5 ml. of quinoline in 1,050 ml. of ethyl acetate is treated with hydrogen at room temperature and under atmospheric pressure. After the calculated amount of hydrogen has been absorbed (about six hours), the hydrogenation reaction is interrupted and the catalyst is filtered off. The filtrate is evaporated under reduced pressure to yield 25.0 g. of cis-N-cinnamyl-phthalimide, M.P. 110–111° after recrystallization from a 1:1-mixture of ethanol and water.

A solution of 45.0 g. of cis-N-cinnamyl phthalimide in 800 ml. of methanol containing 25 ml. of hydrazine hydrate (99–100%) is refluxed for three hours while stirring. After cooling and acidification with concentrated hydrochloric acid, the reaction mixture is again refluxed ›r thirty minutes. After being cooled and filtered, the ›lution is concentrated under reduced pressure to a nall volume and treated with a small amount of water, 50 percent aqueous solution of potassium hydroxide nd a saturated aqueous solution of solid potassium carbonate. The organic material is extracted with diethyl :her, and the organic solution is dried and concentrated nder reduced pressure to yield 16.0 g. of the cis-cinamyl-amine of the formula

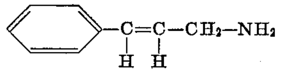

s hydrochloride, prepared by treating the free base ith ethanolic hydrogen chloride and diluting the resultig solution with diethyl ether, melts at 177–178° after :crystallization from a mixture of ethanol and diethyl :her.

*Example 10*

A mixture of 3.0 g. of cis-cinnamyl-amine and 3.14 g. : S-methyl-isothiourea sulfate in 20 ml. of water (free om carbon dioxide) and under an atmosphere of nitro-:n is heated on the steam bath for one hour and then reıxed for an additional three hours. After standing at ›om temperature overnight, the reaction mixture is con-:ntrated under reduced pressure to yield the cis-cinamyl-guanidine sulfate of the formula

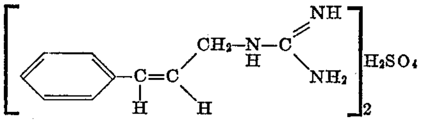

hich melts at 140–143° after recrystallization from ·butanol; yield: 3.25 g.

*Example 11*

Other compounds prepared according to the previously-:scribed method by selecting the appropriate starting ıaterials are, for example:

with an equivalent amount of an alkaline reagent or may be converted directly into the trans-cinnamyl-guanidine by using an excess of ammonium hydroxide.

*Example 13*

A mixture of 24.5 g. of 1-trans-cinnamyl-S-methyl-isothiourea sulfate in aqueous ethanol is reacted with ammonia and mercuric chloride. After several hours, the precipitate is filtered off, and the filtrate is made acidic with sulfuric acid to yield the trans-cinnamyl-guanidine sulfate.

The starting material used in the above procedure is prepared as follows: A mixture of 12.7 g. of trans-cinnamyl-amine in water is reacted with 8.1 g. of sodium thiocyanate and warmed on the water bath for one hour. Upon concentrating the reaction mixture, the 1-trans-cinnamyl-2-thiourea is obtained.

A mixture of 39.4 g. of 1-trans-cinnamyl-2-thiourea in water is treated with 12.8 g. of dimethyl sulfate, while stirring and occasionally cooling to control the reaction. The desired 1-trans-cinnamyl-S-methyl-isothiourea sulfate is obtained upon concentrating the reaction mixture.

*Example 14*

The mixture of 3.35 g. of cis-p-methyl-cinnamylamine, 3.14 g. S-methyl-isothiourea sulfate and 20 ml. water is stirred and refluxed for 6 hours under nitrogen. After standing overnight it is concentrated in vacuo to yield the cis-p-methyl-cinnamyl-guanidine hemisulfate of the formula

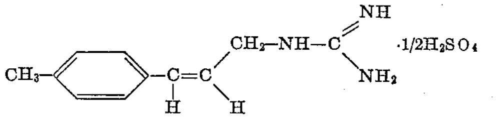

which melts at 164–166° after recrystallization from aqueous ethanol.

In the analogous manner the cis-m-methyl-cinnamyl-guanidine hemisulfate is obtained from the same amount of cis-m-methyl-cinnamylamine; it is very hygroscopic.

| Amine Starting Material | S-Methyl-Isothiourea Reagent | Guanidine Product |
|---|---|---|
| s-cinnamyl-amine | N,N', S-trimethyl-isothiourea hydriodide. | Cis-1,2-dimethyl-3-cinnamyl-guanidine hydriodide. |
| s-p-methoxy-cinnamyl-amine | S-methyl-isothiourea sulfate | Cis-p-methoxy-cinnamyl-guanidine sulfate. |
| s-o-chloro-cinnamyl-amine | do | Cis-o-chloro-cinnamyl-guanidine sulfate. |
| s-m-chloro-cinnamyl-amine | do | Cis-m-chloro-cinnamyl-guanidine sulfate. |
| s-p-chloro-cinnamyl-amine | do | Cis-p-chloro-cinnamyl-guanidine sulfate. |
| ans-cinnamyl-amine | N,S-dimethyl-isothiourea hydriodide | Trans-1-cinnamyl-2-methyl-guanidine hydriodide. |
| Do | N,N'-diethyl-S-methyl-isothiourea hydrobromide. | Trans-1-cinnamyl-2,3-diethyl-guanidine hydrobromide. |
| ans-α-methyl-cinnamyl-amine | S-methyl-isothiourea sulfate | Trans-α-methyl-cinnamyl-guanidine sulfate. |
| ans-β-methyl-cinnamyl-amine | do | Trans-β-methyl-cinnamyl-guanidine sulfate. |
| ans-o-fluoro-cinnamyl-amine | do | Trans-o-fluoro-cinnamyl-guanidine sulfate. |
| ans-o-bromo-cinnamyl-amine | do | Trans-o-bromo-cinnamyl-guanidine sulfate. |
| ans-o,p-dichloro-cinnamyl-amine | do | Trans-o,p-dichloro-cinnamyl-guanidine sulfate. |
| ans-p-methyl-cinnamyl-amine | do | Trans-p-methyl-cinnamyl-guanidine sulfate. |
| ans-m,m',p-trimethoxy-cinnamyl-amine | do | Trans-m,m',p-trimethoxy-cinnamyl-guanidine sulfate. |
| ans-m-methoxy-p-methoxy-carbonyloxy-:innamyl-amine. | do | Trans-m-methoxy-p-methoxy-carbonyloxy-cinnamyl-guanidine sulfate. |
| ans-p-trifluoromethyl-cinnamyl-amine | do | Trans-p-trifluoromethyl-cinnamyl-guanidine sulfate. |
| s-o-fluoro-cinnamyl-amine | do | Cis-o-fluoro-cinnamyl-guanidine sulfate. |
| s-o-bromo-cinnamyl-amine | do | Cis-o-bromo-cinnamyl-guanidine sulfate. |
| s-o,p-dichloro-cinnamyl-amine | do | Cis-o,p-dichloro-cinnamyl-guanidine sulfate. |
| s-p-methyl-cinnamyl-amine | do | Cis-p-methyl-cinnamyl-guanidine sulfate. |
| s-m,m',p-trimethoxy-cinnamyl-amine | do | Cis-m,m',p-trimethoxy-cinnamyl-guanidine sulfate. |
| s-m-methoxy-p-methoxy-carbonyloxy-cinnamyl-ımine. | do | Cis-m-methoxy-p-methoxy-carbonyloxy-cinnamyl-guanidine sulfate. |
| s-p-trifluoromethyl-cinnamyl-amine | do | Cis-p-trifluoromethyl-cinnamyl-guanidine sulfate. |

*Example 12*

A mixture of 13.5 g. of trans-cinnamyl-cyanamide and ).2 g. of ammonium sulfate in 100 ml. of a 15 percent ıueous ammonium hydroxide solution is heated for ›out three hours in an autoclave to about 130° while ;itating. Upon cooling, the reaction mixture yields the ans-cinnamyl-guanidine sulfate, M.P. 246–248°.

The starting material used in the above procedure is ·epared as follows: A mixture of 20.0 g. of trans-cinımyl-amine and 16.0 g. of cyanogen bromide in diethyl her yields the trans-cinnamyl-cyanamide hydrobromide, hich is converted into the free compound by treatment The starting materials are obtained as follows:

75.0 g. m-methyl-acetophenone are added slowly to 145 g. phosphorous pentachloride, cooled in an ice-salt bath, and the reaction mixture is allowed to stand overnight whereby it gradually warms up to room temperature. Hereupon it is heated on a steam bath, the phosphorous oxychloride formed is distilled off in vacuo, the residue is distilled and the fraction boiling at 97–112°/12 mm. collected; it represents the 1-(m-methyl-phenyl)-1,1-dichloro-ethane.

151 g. thereof are added slowly to a stirred solution of 90 g. potassium hydroxide in 350 ml. anhydrous ethanol and the mixture is refluxed for 24 hours. It is then poured onto ice, extracted with diethyl ether, the extract dried, evaporated, the residue distilled and the fraction boiling at 92–100°/25 mm. collected; it represents the m-methyl-phenyl-acetylene. It is converted according to J. Am. Chem. Soc. 60, 2662 (1938) into the 3-(m-methyl-phenyl)-propynol B.P. 115–124°/0.4 mm., this into the 1-(m-methyl-phenyl) - 3-chloro - 1-propyne B.P. 85–90°/0.5 mm. and this according to the method described in Example 9 in the following series of compounds:

N-[3-(m-methyl-phenyl)-2-propynyl]-phthalimide M.P. 120–121°, cis-N-(m-methyl-cinnamyl)-phthalimide M.P. 84° and cis-m-methyl-cinnamylamine B.P. 70–75°/0.5 mm.

The intermediates in the analogous preparation of the cis-p-methyl-cinnamylamine have the following physical data: 2-(p-methyl-phenyl)-propynol B.P. 143–147°/12 mm., 1-(p-methyl-phenyl) - 3-chloro - 1-propyne B.P. 130–131°/15 mm. and N-[3-(p-methyl-phenyl) - 2-propynyl]-phthalimide M.P. 218–223° This compound is converted according to the method described in Example 15 into the 1-(p-methyl-phenyl)-3-amino-1-propyne B.P. 79–80°/0.3 mm. and this into the desired cis-p-methyl-cinnamylamine B.P. 63–65°/0.09 mm.

*Example 15*

The mixture of 3.72 g. cis-o, p-dimethyl-cinnamyl-amine, 3.14 g. S-methyl-isothiourea sulfate and 20 ml. water is stirred and refluxed under nitrogen for 6 hours. After standing overnight it is concentrated in vacuo to yield the cis-o,p-dimethyl-cinnamyl-guanidine hemisulfate of the formula

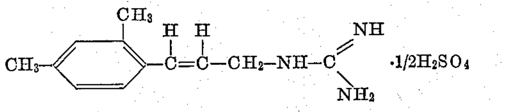

melting at 169–171° after recrystallization from ethanol.

The starting material is prepared according to the method described in Examples 9 and 14, the intermediates have the following physical data:

1 - (o,p-dimethyl-phenyl) - 1,1-dichloro-ethane B.P. 95–98°/15 mm., (o,p-dimethyl-phenyl)-acetylene B.P. 94–96°/32 mm., 3-(o,p-dimethyl-phenyl)-propynol B.P. 115–130°/20 mm., 1-(o,p-dimethyl phenyl)-3-chloro-1-propyne B.P. 115–120°/0.45 mm. and N-[3-(o,p-dimethyl-phenyl)-2-propynyl]-phthalimide M.P. 183–184°.

The mixture of 62 g. thereof, 3500 ml. n-butanol and 32 ml. hydrazine hydrate is refluxed for 3 hours, then cooled and acidified with concentrated hydrochloric acid. The acidic mixture is refluxed for 1½ hours while stirring, hereupon filtered and the filtrate evaporated in vacuo. The residue is dissolved in the minimal amount of water, the solution made alkaline with 50% aqueous potassium hydroxide, extracted with diethyl ether, the extract dried, filtered and evaporated. The residue is distilled and the fraction boiling at 90–95°/0.15 mm. collected; it represents the 1-(o,p,-dimethyl-phenyl)-3-amino-1-propyne.

The solution of 15 g. thereof in 800 ml. ethyl acetate, containing 2 ml. quinoline and 2 g. Lindlar catalyst, is hydrogenated at room temperature and atmospheric pressure until the theoretical amount of hydrogen is absorbed. The mixture is filtered, the filtrate evaporated, the residue distilled and the fraction boiling at 95–97°/0.15 mm. collected; it represents the desired cis-o,p-dimethyl-cinnamylamine.

What is claimed is:

1. A member selected from the group consisting of guanidine compounds having the formula

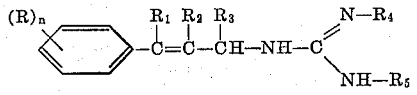

in which R is a member selected from the group consisting of hydrogen, lower alkyl, trifluoromethyl, lower alkoxy, lower alkoxy-carbonyloxy and halogeno, the letter *n* stands for an integer selected from the group consisting of 1, 2 and 3 and each of the groups $R_1$, $R_2$, $R_3$, $R_4$ and $R_5$ is a member selected from the group consisting of hydrogen and lower alkyl, and acid addition salts thereof.

2. A member selected from the group consisting of guanidine compounds having the formula

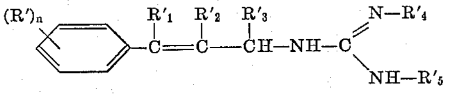

in which R′ is a member selected from the group consisting of hydrogen, lower alkyl, lower alkoxy, halogeno and trifluoromethyl, the letter *n* stands for an integer selected from the group consisting of 1, 2 and 3, each of the groups $R'_1$, $R'_2$ and $R'_3$ is a member selected from the group consisting of hydrogen and methyl, and each of the groups $R'_4$ and $R'_5$ is a member selected from the group consisting of hydrogen and lower alkyl, and an acid addition salt thereof.

3. A member selected from the group consisting of guanidine compounds having the formula

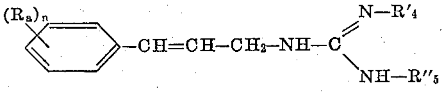

in which $R_a$ stands for a member selected from the group consisting of hydrogen, lower alkyl, lower alkoxy and halogeno, the letter *n* stands for an integer selected from the group consisting of 1, 2 and 3, and each of the groups $R'_4$ and $R''_5$ is a member selected from the group consisting of hydrogen and lower alkyl, and an acid addition salt thereof.

4. Cinnamyl-guanidine.

5. Trans-cinnamyl-guanidine.

6. Trans-cinnamyl-guanidine sulfate.

7. Trans-cinnamyl-guanidine hydrochloride.

8. Trans-cinnamyl-guanidine methane sulfonate.

9. Trans-1,2-dimethyl-3-cinnamyl-guanidine.

10. Trans-p-methoxy-cinnamyl-guanidine.

11. Trans-o-chloro-cinnamyl-guanidine.

12. Trans-m-chloro-cinnamyl-guanidine.

13. Trans-p-chloro-cinnamyl-guanidine.

14. Cis-cinnamyl-guanidine.

15. Cis-cinnamyl-guanidine sulfate.

16. Cis-cinnamyl-guanidine hydrochloride.

17. Cis-p-methyl-cinnamyl-guanidine.

18. Cis-m-methyl-cinnamyl-guanidine.

19. Cis-o,p-dimethyl-cinnamyl-guanidine.

References Cited

Harwood: "Chemical Abstracts," vol. 27, page 1676 (1933), QD1A51.

CHARLES B. PARKER, *Primary Examiner.*

JOSEPH P. BRUST, *Examiner.*

R. V. HINES, *Assistant Examiner.*

UNITED STATES PATENT OFFICE
CERTIFICATE OF CORRECTION

Patent No. 3,332,988 July 25, 1967

Robert Paul Mull

It is certified that error appears in the above identified patent and that said Letters Patent are hereby corrected as shown below:

Column 2, lines 67 to 70, the formula should appear as shown below:

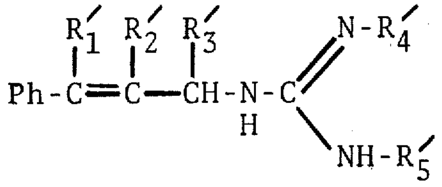

Column 3, lines 10 to 13, the formula should appear as shown below:

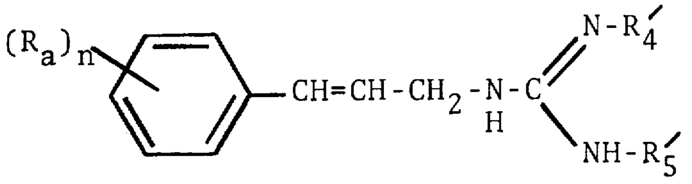

Signed and sealed this 14th day of April 1970.

(SEAL)
Attest:

EDWARD M.FLETCHER,JR.
Attesting Officer

WILLIAM E. SCHUYLER, JR.
Commissioner of Patents